US010429697B2

(12) United States Patent
Kim et al.

(10) Patent No.: US 10,429,697 B2
(45) Date of Patent: **\*Oct. 1, 2019**

(54) CURVED LIQUID CRYSTAL DISPLAY

(71) Applicant: Samsung Display Co., Ltd., Yongin-si (KR)

(72) Inventors: Tae Hoon Kim, Suwon-si (KR); Tae Min Kim, Seoul (KR)

(73) Assignee: Samsung Display Co., Ltd., Yongin-si (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 15/671,668

(22) Filed: Aug. 8, 2017

(65) Prior Publication Data

US 2017/0357128 A1 Dec. 14, 2017

Related U.S. Application Data

(63) Continuation of application No. 14/869,543, filed on Sep. 29, 2015, now Pat. No. 9,759,948.

(30) Foreign Application Priority Data

Nov. 10, 2014 (KR) .......................... 10-2014-0155383
Mar. 25, 2015 (KR) .......................... 10-2015-0041474
Aug. 31, 2015 (KR) .......................... 10-2015-0122352

(51) Int. Cl.
*G02F 1/1337* (2006.01)

(52) U.S. Cl.
CPC .................. *G02F 1/133711* (2013.01); *G02F 2001/133726* (2013.01); *G02F 2001/133742* (2013.01)

(58) Field of Classification Search
None
See application file for complete search history.

(56) References Cited

U.S. PATENT DOCUMENTS 4,804,254 A \* 2/1989 Doll ..................... G02F 1/13392
349/155
8,305,531 B2 11/2012 Seong et al.
(Continued)

FOREIGN PATENT DOCUMENTS

KR 10-2013-0057153 5/2013
KR 10-2013-0111325 10/2013

OTHER PUBLICATIONS

Non-Final Office Action dated Oct. 26, 2016, in U.S. Appl. No. 14/869,543.

(Continued)

*Primary Examiner* — Dung T Nguyen
(74) *Attorney, Agent, or Firm* — H.C. Park & Associates, PLC

(57) ABSTRACT

A curved liquid crystal display (LCD) device includes: a first curved substrate; a second curved substrate; a first curved liquid crystal alignment layer disposed between the first curved substrate and the second curved substrate; a second curved liquid crystal alignment layer includes polymerized reactive mesogens, and a polymerization initiator; and a liquid crystal layer including first and second liquid crystal molecules disposed between the first curved liquid crystal alignment layer and the second curved liquid crystal alignment layer. In an initial state when no electric field is applied, the first liquid crystal molecules are relatively vertically aligned as compared with the second liquid crystal molecules with respect to the first curved substrate and the second liquid crystal molecules are relatively tilt-aligned as compared with the first liquid crystal molecules with respect to the first curved substrate, wherein the first curved liquid crystal alignment layer does not have a polymerization initiator.

17 Claims, 13 Drawing Sheets

(56) References Cited

U.S. PATENT DOCUMENTS

| | | | |
|---|---|---|---|
| 8,993,074 B2 | 3/2015 | Miyakawa et al. | |
| 9,390,642 B2* | 7/2016 | Kim | G09G 3/3225 |
| 9,733,502 B2* | 8/2017 | Lee | G02F 1/1333 |
| 10,088,707 B2* | 10/2018 | Jang | G02F 1/133711 |
| 2002/0159014 A1 | 10/2002 | Tasaka et al. | |
| 2005/0128371 A1 | 6/2005 | Ueda et al. | |
| 2010/0182543 A1 | 7/2010 | Goto et al. | |
| 2011/0025967 A1 | 2/2011 | Sohn et al. | |
| 2011/0242468 A1 | 10/2011 | Choi et al. | |
| 2012/0033167 A1 | 2/2012 | Mizusaki et al. | |
| 2013/0129965 A1 | 5/2013 | Jeong et al. | |
| 2013/0208222 A1* | 8/2013 | Song | C07D 333/16 349/123 |
| 2013/0265532 A1 | 10/2013 | Kim | |
| 2014/0092356 A1 | 4/2014 | Ahn et al. | |
| 2016/0077384 A1 | 3/2016 | Yang et al. | |
| 2017/0045783 A1* | 2/2017 | Lim | G02F 1/133711 |
| 2017/0045784 A1* | 2/2017 | Jang | G02F 1/133711 |

OTHER PUBLICATIONS

Final Office Action dated Feb. 24, 2017, in U.S. Appl. No. 14/869,543.
Notice of Allowance dated May 10, 2017, in U.S. Appl. No. 14/869,543.

* cited by examiner

CURVED LIQUID CRYSTAL DISPLAY

CROSS-REFERENCE TO RELATED APPLICATION

This application is a Continuation of U.S. patent application Ser. No. 14/869,543, filed Sep. 29, 2015, and claims the priority from and the benefit of Korean Patent Application No. 10-2014-0155383 filed on Nov. 10, 2014, Korean Patent Application No. 10-2015-0041474 filed on Mar. 25, 2015 and Korean Patent Application No. 10-2015-0122352 filed on Aug. 31, 2015, each of which are hereby incorporated by reference for all purpose as if fully set forth herein.

BACKGROUND

Field

The invention relates to a curved liquid crystal display (LCD).

Discussion of the Background

Liquid crystal displays (LCDs) are one of the most widely used types of flat panel displays. Generally, an LCD includes a pair of display panels having electric field generating electrodes such as pixel electrodes and a common electrode and a liquid crystal layer interposed between the display panels.

The LCD generates an electric field in the liquid crystal layer by applying voltages to the electric field generating electrodes. Accordingly, the alignment of liquid crystals of the liquid crystal layer is determined, and polarization of incident light is controlled. As a result, an image is displayed on the LCD.

As LCDs are used as displays of television receivers, their screen is becoming larger in size. As the size of the LCDs increases, a viewing angle may greatly differ depending on whether a viewer watches a central part of the screen or both ends of the screen.

To compensate for this difference in viewing angle, LCDs may be curved (concave or convex). From the perspective of a viewer, LCDs may be classified into portrait-type LCDs whose vertical length is greater than their horizontal length and are curved in a vertical direction and landscape-type LCDs whose vertical length is smaller than their horizontal length and are curved in a horizontal direction.

SUMMARY

Exemplary embodiments of the invention provide a curved liquid crystal display (LCD) with improved light transmittance.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, a curved liquid crystal display (LCD), comprises a first curved substrate; a second curved substrate; a first curved liquid crystal alignment layer disposed between the first curved substrate and the second curved substrate; a second curved liquid crystal alignment layer disposed between the first curved liquid crystal alignment layer and the second curved substrate; and a liquid crystal layer including first and second liquid crystal molecules with negative dielectric anisotropy and disposed between the first curved liquid crystal alignment layer and the second curved liquid crystal alignment layer, the first liquid crystal molecules are aligned at a surface of the first curved liquid crystal alignment layer, and the second liquid crystal molecules are aligned at a surface of the second curved liquid crystal alignment layer, wherein, in an initial state when no electric field is applied, the first liquid crystal molecules are relatively vertically aligned as compared with the second liquid crystal molecules with respect to the first curved substrate and the second liquid crystal molecules are relatively tilt-aligned as compared with the first liquid crystal molecules with respect to the first curved substrate.

The curved LCD according to the exemplary embodiment of the invention, may further comprise a patternless electrode disposed between the first curved substrate and the first curved liquid crystal alignment layer and having no slit pattern; and a pattern electrode disposed between the second curved liquid crystal alignment layer and the second curved substrate and having a slit pattern.

In the curved LCD according to the exemplary embodiment of the invention, the second curved liquid crystal alignment layer may have a higher content of polymerized reactive mesogens per unit area than the first curved liquid crystal alignment layer.

In the curved LCD according to the exemplary embodiment of the invention, the first curved liquid crystal alignment layer may have a lower content of a polymerization initiator than the second curved liquid crystal alignment layer.

In the curved LCD according to the exemplary embodiment of the invention, the second curved liquid crystal alignment layer may include a "2-1" curved liquid crystal alignment layer and a "2-2" curved liquid crystal alignment layer having a lower content of an imide group (—CON-HCO—) than the "2-1" curved liquid crystal alignment layer and having a higher content of polymerized reactive mesogens than the "2-1" curved liquid crystal alignment layer.

In the curved LCD according to the exemplary embodiment of the invention, a side of the first curved substrate facing a user viewing an image displayed by the LCD may be concave.

According to another exemplary embodiment of the invention, a curved liquid crystal display (LCD), comprises a first curved substrate; a second curved substrate; a liquid crystal layer disposed between the first curved substrate and the second curved substrate, the liquid crystal layer including liquid crystal molecules with negative dielectric anisotropy; a first curved liquid crystal alignment layer disposed between the liquid crystal layer and the first curved substrate; and a second curved liquid crystal alignment layer disposed between the liquid crystal layer and the second curved substrate, the second curved liquid crystal alignment layer having a higher content of a polymerization initiator than the first curved liquid crystal alignment layer.

The curved LCD according to the another exemplary embodiment of the invention, may further comprise a patternless electrode disposed between the first curved substrate and the first curved liquid crystal alignment layer and having no slit pattern; and a pattern electrode disposed between the second curved liquid crystal alignment layer and the second curved substrate and having a slit pattern.

In the curved LCD according to the another exemplary embodiment of the invention, the liquid crystal molecules may include first liquid crystal molecules aligned at a surface of the first curved liquid crystal alignment layer and second liquid crystal molecules aligned at a surface of the second curved liquid crystal alignment layer, in an initial state when no electric field is applied, the first liquid crystal molecules may be relatively vertically aligned as compared with the second liquid crystal molecules with respect to the first curved substrate and the second liquid crystal molecules may be relatively tilt-aligned as compared with the first liquid crystal molecules with respect to the first curved substrate.

In the curved LCD according to the another exemplary embodiment of the invention, the second curved liquid crystal alignment layer may include a "2-1" curved liquid crystal alignment layer and a "2-2" curved liquid crystal alignment layer having a lower content of an imide group (—CONHCO—) than the "2-1" curved liquid crystal alignment layer and having a higher content of polymerized reactive mesogens than the "2-1" curved liquid crystal alignment layer.

In the curved LCD according to the another exemplary embodiment of the invention, a side of the first curved substrate facing a user viewing an image displayed by the LCD may be concave.

According to the exemplary embodiments, it is possible to provide a curved LCD with improved light transmittance.

Other features and exemplary embodiments will be apparent from the following detailed description, the drawings, and the claims.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE ILLUSTRATED EMBODIMENTS

Figure 1:
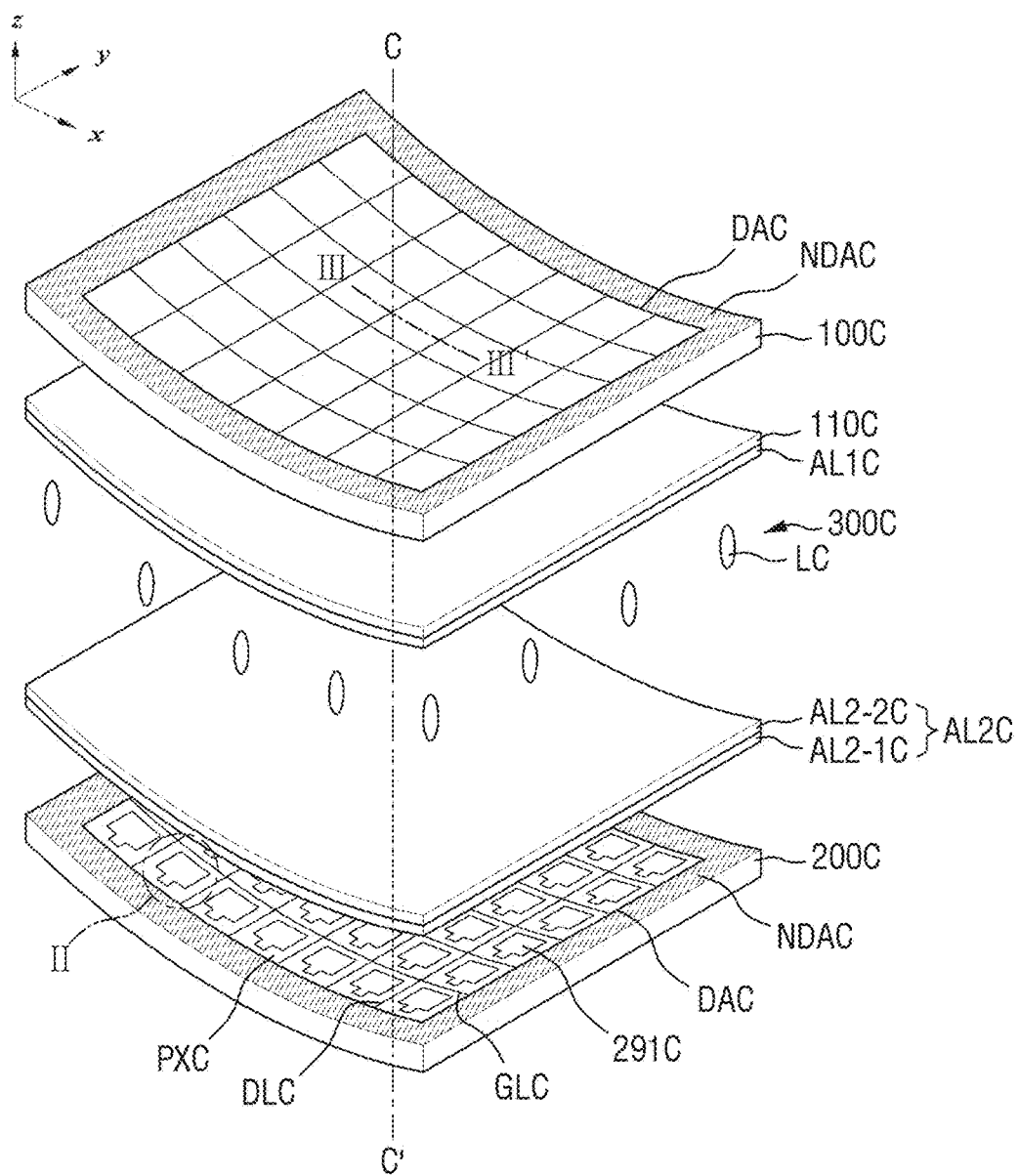
FIG. 1 is a schematic exploded oblique view of a curved liquid crystal display (LCD) according to an exemplary embodiment of the invention.

Features of the inventive concept and methods of accomplishing the same may be understood more readily by reference to the following detailed description of preferred embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims.

In the drawings, the thickness of layers and regions are exaggerated for clarity. It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on", "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially related terms, such as "below", "lower", "under", "above", "upper" and the like, may be used herein for ease of description to describe the relationship of one element or feature to another element(s) or feature(s) as illustrated in the figures. It will be understood that the spatially related terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially related descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used in this specification, specify the presence of stated features, integers, operations, elements, and/or components, but do not preclude the presence or addition of one or more other features, integers, steps, operations, elements, components, and/or groups thereof.

Exemplary embodiments of the invention will hereinafter be described with reference to the accompanying drawings.

Figure 2:
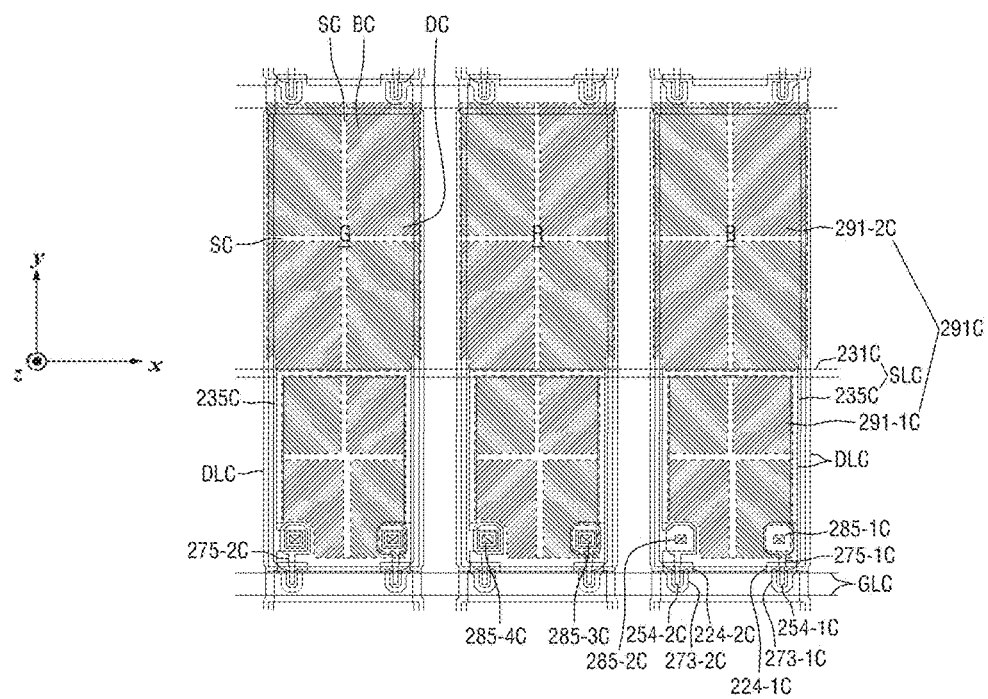
FIG. 2 is a schematic enlarged view of area II of FIG. 1.

FIG. 1 is a schematic exploded oblique view of a curved liquid crystal display (LCD) according to an exemplary embodiment of the invention. FIG. 2 is a schematic enlarged view of area II of FIG. 1.

Referring to FIGS. 1 and 2, a curved LCD 500C includes a first curved substrate 100C, a second curved substrate 200C spaced apart from and faces the first curved substrate 100C, and a liquid crystal layer 300C disposed between the first curved substrate 100C and the second curved substrate 200C.

Each of the first and second curved substrates 100C and 200C includes a display area DAC and a non-display area NDAC. The display area DAC is a region where an image can be viewed, and the non-display area NDAC is a region where no image is viewed. The display area DAC is surrounded by the non-display area NDAC.

A common electrode 110C may be disposed between the first curved substrate 100C and the second curved substrate 200C, and may be a "patternless" electrode with no slit pattern. Pixel electrodes 291C may be disposed between the second curved substrate 200C and the common electrode 110C, and may be pattern electrodes with slit patterns.

The liquid crystal layer 300C may be disposed between the common electrode 110C and the pixel electrodes 291C. The liquid crystal layer 300C may include liquid crystal molecules LC with negative dielectric anisotropy. A first curved liquid crystal alignment layer AL1C may be disposed between the common electrode 110C and the liquid crystal layer 300C. A second curved liquid crystal alignment layer AL2C may be disposed between the liquid crystal layer 300C and the pixel electrodes 291C.

The second curved substrate 200C may be a thin-film transistor (TFT) substrate. In the display area DAC of the second curved substrate 200C, a plurality of gate lines GLC, which extend in a first direction, and a plurality of data lines DLC, which extend in a second direction that is perpendicular to the first direction, may be formed. The pixel electrodes 291C may be disposed in pixels PXC, respectively, which are defined by the gate lines GLC and the data lines DLC.

Each of the pixel electrodes 291C may include sub-pixel electrodes 291-1C and 291-2C, which are spaced apart from each other. For example, the sub-pixel electrodes 291-1C and 291-2C may be generally rectangular. Each of the sub-pixel electrodes 291-1C and 291-2C may be pattern electrodes with slit patterns. More specifically, each of the sub-pixel electrodes 291-1C and 291-2C may have slit patterns including a stem SC, branches BC extended from the stem SC and incisions DC disposed among the stem SC and the branches BC. The stem SC may be formed in a cross shape, and the branches BC may be radially branched off from the stem SC at an angle of about 45° relative to the stem SC.

Each of the gate lines GLC may include gate electrodes 224-1C and 224-2C, which protrude from the gate lines GLC toward the pixel electrodes 291C along the second direction. Each of the data lines DLC may include source electrodes 273-1C and 273-2C and drain electrodes 275-1C and 275-2C. The source electrodes 273-1C and 273-2C may protrude from the data lines DLC and may be formed in a U shape. The drain electrodes 275-1C and 275-2C may be spaced apart from the source electrodes 273-1C and 273-2C.

The pixel electrodes 291C may be provided with a data voltage via switching elements TFTs. The gate electrodes 224-1C and 224-2C, which correspond to the control terminals of the TFTs, may be electrically connected to one of the gate lines GLC, and the source electrodes 273-1C and 273-2C, which correspond to the input terminals of the TFTs, may be electrically connected to one of the data lines DLC via contact holes 285-1C, 285-2C, 285-3C and 285-4C, and the drain electrodes 275-1C and 275-2C, which correspond to the output terminals of the TFTs, may be electrically connected to one of the pixel electrodes 291C.

The pixel electrodes 291C may generate an electric field together with the common electrode 110C and may thus control the alignment direction of the liquid crystal molecules LC of the liquid crystal layer 300C, which is disposed between the common electrode 110C and the pixel electrodes 291C. The pixel electrodes 291C may distort the electric field and may thus control the alignment direction of first liquid crystal molecules LC1 and the alignment direction of second liquid crystal molecules LC2.

The TFT substrate may have a structure in which a base substrate (not illustrated) formed of glass or a polymer, the gate electrodes 224-1C and 224-2C, a gate insulating layer (not illustrated), a semiconductor layer (not illustrated), an ohmic contact layer (not illustrated), the source electrodes 273-1C and 273-2C, the drain electrodes 27501C and 275-2C, a passivation layer (not illustrated) and an organic layer (not illustrated) are stacked.

The channel of the TFTs may be formed by the semiconductor layer. The semiconductor layer may be disposed to overlap the gate electrodes 224-1C and 224-2C. The source electrodes 273-1C and 273-2C may be spaced apart from the drain electrodes 275-1C and 275-2C, respectively, relative to the semiconductor layer.

A sustain electrode line SLC may include a stem line 231C, which extends substantially in parallel to the gate lines GLC, and a plurality of branch lines 235C, which are branched off from the stem line 231C. The sustain electrode line SLC may be optional, and the shape and arrangement of the sustain electrode line SLC may be varied.

The non-display area NDAC, which is the periphery of the display area DAC, may be a light-shielding region surrounding the display area DAC. In the non-display area NDAC of the second curved substrate 200C, one or more driving units (not illustrated) providing a gate driving signal and a data driving signal to each of the pixels PXC in the display area DAC may be provided. The gate lines GLC and the data lines DLC may extend from the display area DAC through to the non-display area NDAC, and may be connected to the driving units.

The first curved substrate 100C may be a substrate opposite to the second curved substrate 200C. The common electrode 110C may be disposed on the first curved substrate 100C.

A color filter layer (not illustrated) may be formed in part of the display area DAC corresponding to each of the pixels PXC, and may include red (R), green (G) and blue (B) color filters. The color filter layer may be included in one of the first and second curved substrates 100C and 200C. For example, in response to the color filter layer being included in the first curved substrate 100C, the first curved substrate 100C may have a structure in which a base substrate (not illustrated) formed of glass or a polymer, the color filter layer and an overcoat layer (not illustrated) are stacked. The overcoat layer may be a planarization layer covering the color filter layer. In this example, the common electrode 110C may be disposed on the overcoat layer.

Alternatively, in response to the color filter layer being included in the second curved substrate 200C, the second curved substrate 200C may have a color-filter-on-array (COA) structure in which the color filter layer is formed on a transparent insulating substrate where the TFTs are provided. For example, the color filter layer may be disposed between an organic layer and a passivation layer that covers the source electrodes 273-1C and 273-2C and the drain electrodes 275-1C and 275-2C.

A light-shielding pattern layer (not illustrated) may be disposed along the boundaries among the R, G and B color filters of the color filter layer. The light-shielding pattern layer may be included in one of the first and second curved substrates 100C and 200C. For example, the light-shielding pattern layer may be a black matrix.

During the fabrication of the curved LCD 500C by bending a flat-panel LCD, a misalignment may occur between the first curved substrate 100C and the second curved substrate 200C due to the stress applied to the first and second curved substrates 100C and 200C. For example, during the bending of the flat-panel LCD, the first curved substrate 100C may be shifted leftward or rightward relative to the second curved substrate 200C, and as a result, the state of the alignment of the first and second curved substrates 100C and 200C may become different from the state of the alignment of the first and second flat substrates of the flat-panel LCD. Such misalignment between the first curved substrate 100C and the second curved substrate 200C may degrade the display quality of the curved LCD 500C.

For example, when each of the first and second curved liquid crystal alignment layers AL1C and AL2C includes multiple domains that differ from each other in the alignment direction of the directors of liquid crystal molecules therein, any misalignment between the domains of the first curved liquid crystal alignment layer AL1C and the domains of the second curved liquid crystal alignment layer AL2C may cause interference or a conflict in an alignment direction between the first liquid crystal molecules LC1, which are aligned at an inclination at the surface of the first curved liquid crystal alignment layer AL1C, and the second liquid crystal molecules LC2, which are aligned at an inclination at the surface of the second curved liquid crystal alignment layer AL2C along a different direction from the first liquid crystal molecules LC1. As a result, the liquid crystal molecules between the first liquid crystal molecules LC1 and the second liquid crystal molecules LC2 may be vertically aligned, thereby forming texture. The texture, however, may be viewed within the display area DAC as a smudge or dark area and may lower the light transmittance of the curved LCD 500C.

Figure 3:
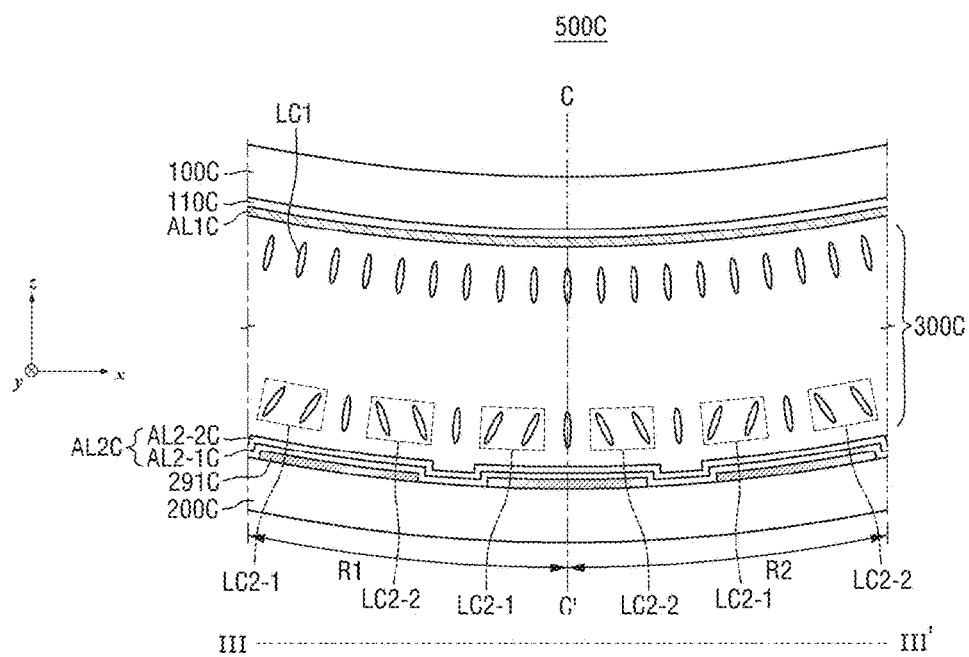
FIG. 3 is a schematic cross-sectional view taken along line III-III' of FIG. 1.

The curved LCD 500C will hereinafter be described in further detail with reference to FIG. 3. FIG. 3 is a cross-sectional view taken along line III-III' of FIG. 1. More specifically, FIG. 3 illustrates an initial state of alignment of liquid crystal molecules in the curved LCD 500C when an electric field is yet to be applied.

Referring to FIG. 3, the first liquid crystal molecules LC1 may be liquid crystal molecules aligned at the surface of the first curved liquid crystal alignment layer AL1C. The second liquid crystal molecules LC2, i.e., "2-1" liquid crystal molecules LC2-1 and "2-2" liquid crystal molecules LC2-2, may be liquid crystal molecules aligned at the surface of the second curved liquid crystal alignment layer AL2C. The first liquid crystal molecules LC1 are relatively vertically aligned than the second liquid crystal molecules LC2. The second liquid crystal molecules LC2 are relatively tilt-aligned or obliquely aligned than the first liquid crystal molecules LC1. In other words, the first liquid crystal molecules LC1 have a pre-tilt angle larger than that of the second liquid crystal molecules LC2-1 and LC2-2, and the second liquid crystal molecules LC2-1 and LC2-2 have a pre-tilt angle smaller than that of the first liquid crystal molecules LC1.

The pre-tilt angle is an angle between the directors of the curved substrates 100C and 200C and a director of the liquid crystal molecules LC1, LC2-1 and LC2-2. The pre-tilt angle of the liquid crystal molecules LC1, LC2-1 and LC2-2 at the apex of the curved substrates 100C and 200C is substantially the same as the pre-tilt angle of the liquid crystal molecules LC1, LC2-1 and LC2-2 in the flat substrates. For example, a radius R of curvature of the curved LCD 500C may be equal to or greater than 2000 mm and equal to or less than 5000 mm. In this case, the pre-tilt angle of the liquid crystal molecules LC1, LC2-1 and LC2-2 at the apex of the curved substrates 100C and 200C is substantially the same as the pre-tilt angle of the liquid crystal molecules LC1, LC2-1 and LC2-2 in the flat substrates. The term "apex", as used herein, denotes an arbitrary point on a curve where the slope of a tangent at the point is substantially zero.

The pre-tilt angle of the liquid crystal molecules LC1, LC2-1 and LC2-2 may be adjusted by controlling the concentration of the reactive mesogens, the concentration of the polymerization initiator, the voltage and the amount of irradiation. As more polymers of reactive mesogens are formed, the liquid crystal molecules LC1, LC2-1 and LC2-2 can be aligned at an inclination. As the concentration of the polymerization initiator is higher, more polymers of reactive mesogens can be formed.

A difference in the pre-tilt angle between the first liquid crystal molecules LC1 aligned on the surface of the first curved liquid crystal alignment layer AL1C and the second liquid crystal molecules LC2-1 and LC2-2 aligned on the surface of the second curved liquid crystal alignment layer AL2C is due to a difference in the content of the polymers of reactive mesogens.

The first curved liquid crystal alignment layer AL1C has a relatively low content of the polymers of reactive mesogens as compared to the second curved liquid crystal alignment layer AL2C. In other words, the second curved liquid crystal alignment layer AL2C has a relatively high content of the polymers of reactive mesogens as compared to the first curved liquid crystal alignment layer AL1C.

The reactive mesogens are compounds having a polymerizable end group for polymerization and a mesogenic structure to develop the liquid crystallinity and, for example, may be represented by Formula (1):

$$P1\text{-}SP1\text{-}MG\text{-}SP2\text{-}P2 \qquad \text{(Formula 1)}$$

In Formula (1), each of P1 and P2 is a polymerizable end group, for example, a (meth)acrylate group, a vinyl group, a vinyloxy group, an epoxy group, or the like. SP1 is a spacer group linking P1 to MG, for example, an alkyl group having a carbon number of 1 to 12, an alkoxy group having a carbon number of 1 to 12, or the like. SP2 is a spacer group linking P2 to MG, for example, an alkyl group having a carbon number of 1 to 12, an alkoxy group having a carbon number of 1 to 12, or the like. MG is a mesogenic structure, for example, cyclohexyl group, biphenyl group, terphenly group, naphthalene or the like.

Meanwhile, the polymerization initiator serves to initiate the polymerization of the reactive mesogens. As the concentration of the polymerization initiator is higher, more polymers of reactive mesogens can be formed. The second curved liquid crystal alignment layer AL2C may have a relatively high content of the polymerization initiator as compared to the first curved liquid crystal alignment layer AL1C. In other words, the first curved liquid crystal alignment layer AL1C may have a relatively low content of the polymerization initiator as compared to the second curved liquid crystal alignment layer AL2C.

Therefore, the second liquid crystal molecules LC2-1 and LC2-2 aligned on the surface of the second curved liquid crystal alignment layer AL2C may be aligned relatively at an inclination as compared to the first liquid crystal molecules LC1 aligned on the surface of the first curved liquid crystal alignment layer AL1C. The first liquid crystal molecules LC1 aligned on the surface of the first curved liquid crystal alignment layer AL1C may be aligned relatively vertically as compared to the second liquid crystal molecules LC2-1 and LC2-2 aligned on the surface of the second curved liquid crystal alignment layer AL2C.

The curved LCD 500C may suppress the occurrence of a smudge or a dark portion caused due to a collision of the alignment directions of the first liquid crystal molecules LC1 and the second liquid crystal molecules LC2-1 and LC2-2 by making different the pre-tilt angles of the first liquid crystal molecules LC1 and the second liquid crystal molecules LC2-1 and LC2-2.

For example, the first liquid crystal alignment layer surface AL1C may be a vertical alignment (VA)-type liquid crystal alignment layer comprising a polyimide with at least one VA group bonded thereto, selected from among a hydrocarbon derivative having an imide group (—CONHCO—) in the repeating unit of the main chain thereof, having an alkyl group in the side chain thereof, and having the terminal thereof substituted with an alkyl group, a hydrocarbon derivative having the terminal thereof substituted with a cycloalkyl group, and a hydrocarbon derivative having the terminal thereof substituted with aromatic hydrocarbon.

For example, the second curved liquid crystal alignment layer AL2C may have a multilayer structure consisting of a "2-1" curved liquid crystal alignment layer AL2-1C and a "2-2" curved liquid crystal alignment layer AL2-2C. The second curved liquid crystal alignment layer AL2C may includes a polymerization initiator contrary to the first curved liquid crystal alignment layer AL1C.

For example, the "2-1" curved liquid crystal alignment layer AL2-1C may be a VA-type liquid crystal alignment layer comprising a polyimide having an imide group (—CONHCO—) in the repeating unit of the main chain thereof and having the VA group and the polymerization initiator bonded to the side chain thereof. The "2-2" curved liquid crystal alignment layer AL2-2C may comprise polymers of reactive mesogens. The polymers of reactive mesogens may be spaced apart from each other on the surface of the "2-1" curved liquid crystal alignment layer AL2-1C.

For example, the polymerization initiator may be at least one selected from among acetophenone, benzoin, benzophenone, dimethoxy acetophenone, phenyletone, thioxanthone, 2-hydroxy-2-methyl-1-phenylpropan-1-one, benzyl dimethyl tar, 4-(2-hydroxyethoxy)phenyl-(2-hydroxyethyl)-2-propyl ketone, 1-hydroxycyclohexyl phenyl ketone, o-benzoyl methyl benzoate, 4-phenyl benzophenone, 4-benzoyl-4'-methyl-diphenyl sulfide, (4-benzoyl-benzyl) trimethylammonium chloride, bis(2,4,6-trimethylbenzoyl)-phenyl phosphine oxide, diphenyl(2,4,6-trimethylbenzoyl) phosphine oxide, 2-hydroxy methyl propionic nitrile, 2,2'-{azobis(2-methyl-N-[1,1'-bis(hydroxymethyl)-2-hydroxyethyl) propionamide], acrylate[(2-methoxy-2-phenyl-2-benzoyl)ethyl]ester, phenyl 2-acryloyloxy-2-propyl ketone, phenyl 2-methacryloyloxy-2-propyl ketone, 4-isopropylphenyl 2-acryloyloxy-2-propyl ketone, 4-chlorophenyl 2-acryloyloxy-2-propyl ketone, 4-dodecylphenyl 2-acryloyloxy-2-propyl ketone, 4-methoxyphenyl 2-acryloyloxy-2-propyl ketone, 4-acryloyloxyphenyl 2-hydroxy-2-propyl ketone, 4-methacryloyloxy 2-hydroxy-2-propyl ketone, 4-(2-acryloyloxyethoxy)-phenyl 2-hydroxy-2-propyl ketone, 4-(2-acryloyloxydiethoxy)-phenyl 2-hydroxy-2-propyl ketone, 4-(2-acryloyloxyethoxy)-benzoin, 4-(2-acryloyloxyethylthio)-phenyl 2-hydroxy-2-propyl ketone, 4-N,N'-bis-(2-acryloyloxyethyl)-aminophenyl 2-hydroxy-2-propyl ketone, 4-acryloyloxyphenyl 2-acryloyloxy-2-propyl ketone, 4-methacryloyloxyphenyl 2-meythacryloyloxy-2-propyl ketone, 4-(2-acryloyloxyethoxy)-phenyl 2-acryloyloxy-2-propyl ketone, 4-(2-acryloyloxydiethoxy)-phenyl 2-acryloyloxy-2-propyl ketone, dibenzyl ketone, benzoin alkyl ether, benzoin methyl ether, benzoin ethyl ether, benzoin isopropyl ether, benzoin isobutyl ether, dialkyl acetophenone, hydroxyl alkylketone, phenyl glyoxylate, benzyl dimethyl ketal, acyl phosphine, and α-aminoketone, but the invention is not limited thereto.

Referring further to FIG. 3, in an initial state when no electric field is applied to the curved LCD 500C, the second curved liquid crystal alignment layer AL2C may form at least two domains that differ from each other in the alignment direction of liquid crystal molecules therein in each of first and second regions R1 and R2, but the first curved liquid crystal alignment layer AL1C may form only one domain where the alignment direction of liquid crystal molecules is substantially uniform throughout the first and second regions R1 and R2. The first and second regions R1 and R2 denote left and right sides, respectively, of an imaginary straight line C-C' that passes through the apex of the first curved substrate 100C and the apex of the second curved substrate 200C.

In the first region R1 and the second region R2 of the second curved liquid crystal alignment layer AL2C, the "2-1" liquid crystal molecules LC2-1 may be aligned in a first oblique direction, and the "2-2" liquid crystal molecules LC2-2 may be aligned in a second oblique direction. The second curved liquid crystal alignment layer AL2C may form at least two domains in which the alignment direction of the "2-1" liquid crystal molecules LC2-1 and the alignment direction of the "2-2" liquid crystal molecules LC2-2 are different from each other in the first region R1. The second curved liquid crystal alignment layer AL2C may form at least two domains in which the alignment direction of the "2-1" liquid crystal molecules LC2-1 and the alignment direction of the "2-2" liquid crystal molecules LC2-2 are different from each other in the second region R2. The first oblique direction may be the direction of an angle of about $-\alpha°$ (where α is a positive real number) with respect to the imaginary straight line C-C', and the second oblique direction may be the direction of an angle of about $+\alpha°$ with respect to the imaginary straight line C-C'.

On the other hand, in the first region R1 of the first curved liquid crystal alignment layer AL1C, the first liquid crystal molecules LC1 may all be aligned in a third oblique direction and may thus form a single domain. In the second region R2 of the first liquid crystal alignment layer AL1C, the first liquid crystal molecules LC1 may all be aligned in a fourth oblique direction and may thus form a single domain. For example, the third oblique direction may be the direction of an angle of about $-\beta°$ (where β is a positive real number) with respect to the imaginary straight line C-C', and the fourth oblique direction may be the direction of an angle of about $+\beta°$ with respect to the imaginary straight line C-C'.

As described above, multiple domains in which the alignment directions of the liquid crystal molecules are different from each other are formed selectively only in the second curved liquid crystal alignment layer AL2C from among the first curved liquid crystal alignment layer AL1C and the second curved liquid crystal alignment layer AL2C in each of the first region R1 and the second region R2, thereby suppressing the occurrence of a spot defect or a dark portion caused due to a collision of the alignment directions of the first liquid crystal molecules LC1 and the second liquid crystal molecules LC2-1 and LC2-2.

A method of fabricating the curved LCD 500C will hereinafter be described with reference to FIGS. 4 to 9.

the VA group bonded to the side chain thereof onto the common electrode 110 and drying the polyimide. The first VA polyimide may have an imide group (—CONHCO—) in the repeating unit of the main chain thereof and have a VA group only in the side chain thereof. The VA group has already been described above, and thus, a detailed description thereof will be omitted.

For example, the first VA polyimide may comprise, but is not limited to, a polymer compound represented by Formula (2):

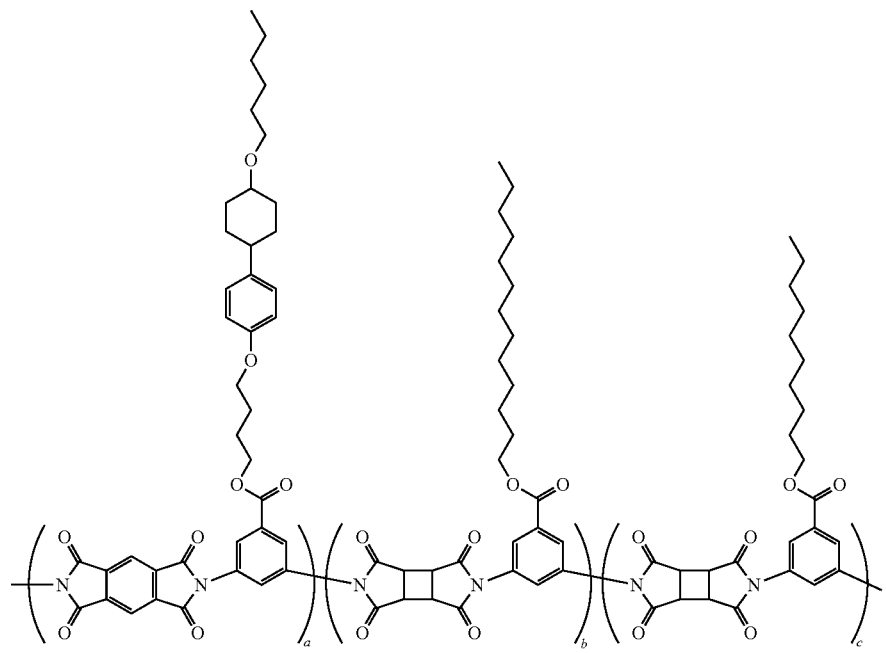

(2)

FIGS. 4 to 9 are cross-sectional views illustrating a method of fabricating the curved LCD 500C.

Figure 4:
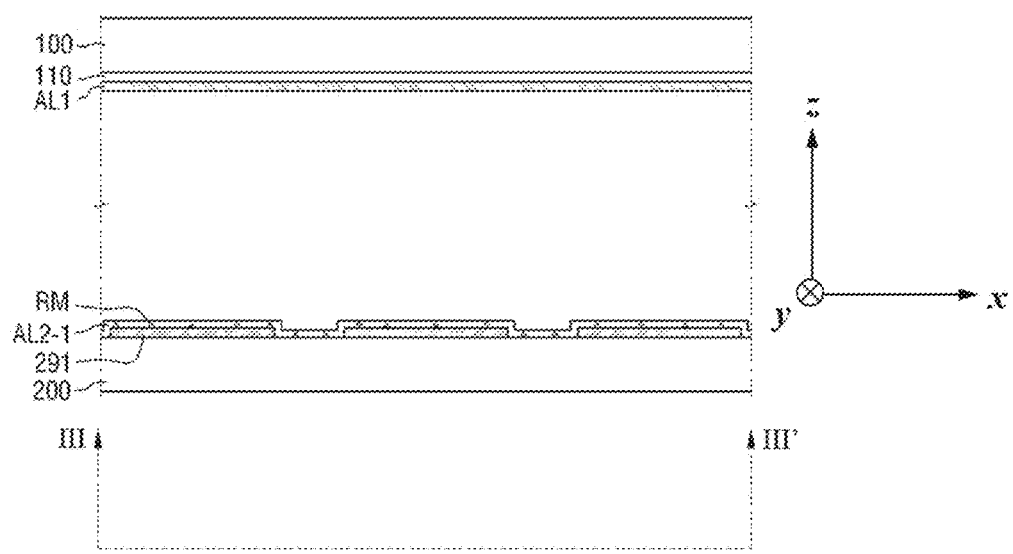
FIGS. 4 to 9 are cross-sectional views illustrating a method of fabricating the curved LCD according to the exemplary embodiment of FIG. 1.

Referring to FIG. 4, a first flat substrate 100 is disposed to face a second flat substrate 200 while maintaining a predetermined cell gap with the second flat substrate 200. For example, the second flat substrate 200 may be a TFT substrate, and the first flat substrate 100 may be a color filter substrate opposite to the second flat substrate 200.

A common electrode 110 may be disposed on the first flat substrate 100, and a first flat liquid crystal alignment layer AL1 may be disposed on the common electrode 110. The common electrode 110 may be formed of indium tin oxide (ITO), indium zinc oxide (IZO), indium zinc oxide, indium oxide, zinc oxide, tin oxide, gallium oxide, titanium oxide, aluminum (Al), silver (Ag), platinum (Pt), chromium (Cr), molybdenum (Mo), tantalum (Ta), niobium (Nb), zinc (Zn), magnesium (Mg), or an alloy or a deposition layer thereof. As mentioned above with regard to common electrode 110C, the common electrode 110 may be a "patternless" electrode with no slit patterns.

For example, the first flat liquid crystal alignment layer AL1 may be formed by applying a first VA polyimide with where a, b and c are natural numbers.

Pixel electrodes 291 may be disposed on the second flat substrate 200, and a "2-1" flat liquid crystal alignment layer AL2-1 may be disposed on the pixel electrodes 291.

The pixel electrodes 291 may be formed of ITO, IZO, indium zinc oxide, indium oxide, zinc oxide, tin oxide, gallium oxide, titanium oxide, Al, Ag, Pt, Cr, Mo, Ta, Nb, Zn, Mg, or an alloy or a deposition layer thereof. As mentioned above with the pixel electrodes 291C, the pixel electrodes 291 may be pattern electrodes with slit patterns. The second flat substrate 200 may be partially exposed through the slit patterns of the pixel electrodes 291.

For example, the "2-1" flat liquid crystal alignment layer AL2-1 may be formed by applying a composite liquid crystal aligning agent, comprising a second VA polyimide with the VA group and a polymerization initiator in the side chain thereof and reactive mesogens RM, onto the pixel electrodes 291 and drying the composite liquid crystal aligning agent. The second VA polyimide, unlike the first VA polyimide, may include the polymerization initiator. The VA group and the polymerization initiator have already been described above, and thus, detailed descriptions thereof will be omitted.

The "2-1" flat liquid crystal alignment layer AL2-1 may comprise, but is not limited to, a polymer compound represented by Formula (3):

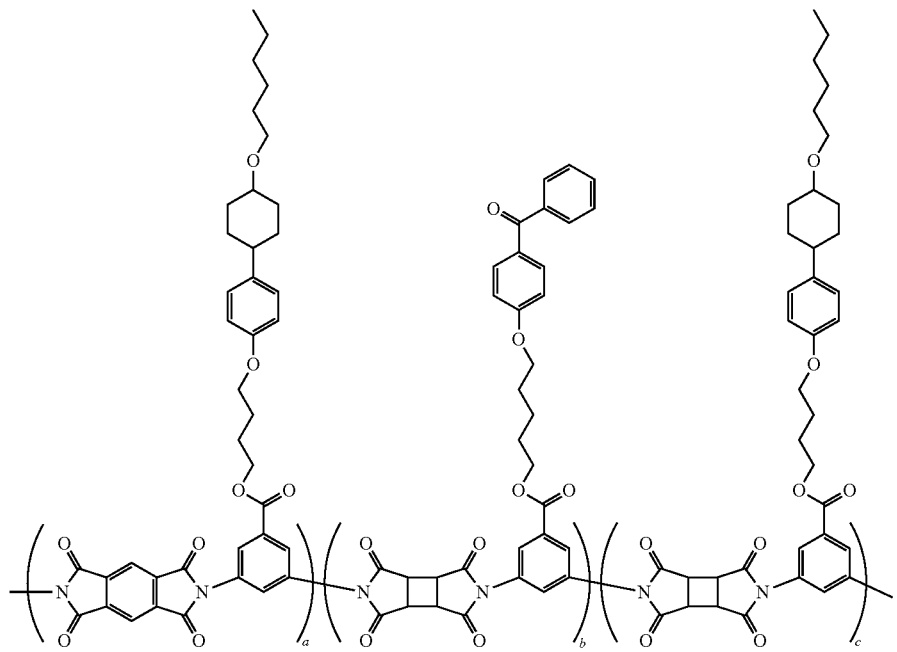

where a, b and c are natural numbers.

The polymerization initiator absorbs ultraviolet (UV) light and is thus easily decomposed into radicals, thereby facilitating the photo-polymerization of the reactive mesogens RM. For example, the polymerization initiator may absorb UV light within a long wavelength range of about 300 nm to about 400 nm, and may thus be decomposed into radicals, thereby facilitating the photo-polymerization of the reactive mesogens RM.

Figure 5:
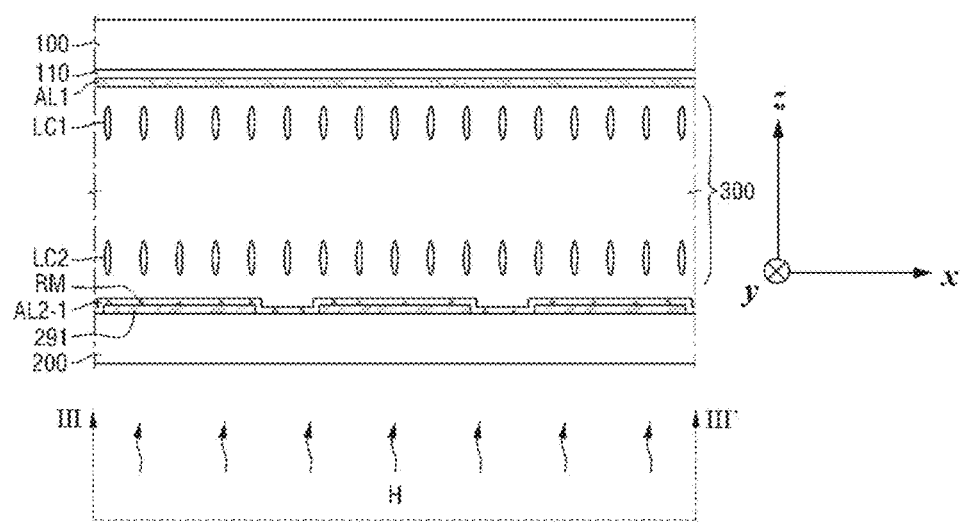

Referring to FIG. 5, the liquid crystal layer 300 is disposed between the first flat substrate 100 and the second flat substrate 200. The liquid crystal layer 300 may be formed by injecting or dropping a liquid crystal composition comprising liquid crystal molecules (LC1 and LC2) between the first flat substrate 100 and the second flat substrate 200.

Each of the liquid crystal molecules have negative dielectric anisotropy. In an initial state when no electric field is applied to a flat LCD 500, the liquid crystal molecules may be substantially vertically aligned with respect to the first and second flat substrates 100 and 200. That is, during the initial state, the VA group of the first flat liquid crystal alignment layer AL1 and the VA group of the "2-1" flat liquid crystal alignment layer AL2-1 may align the liquid crystal molecules substantially vertically with respect to the first and second flat substrates 100 and 200. The expression "liquid crystal molecules substantially vertically with respect to the first and second flat substrates 100 and 200", as used herein, means that the liquid crystal molecules are aligned at an angle of about 88° to 90° with respect to the first and second flat substrates 100 and 200.

After the formation of the liquid crystal layer 300, a thermal treatment process H may be performed by applying heat from below the first flat substrate 100.

Figure 6:
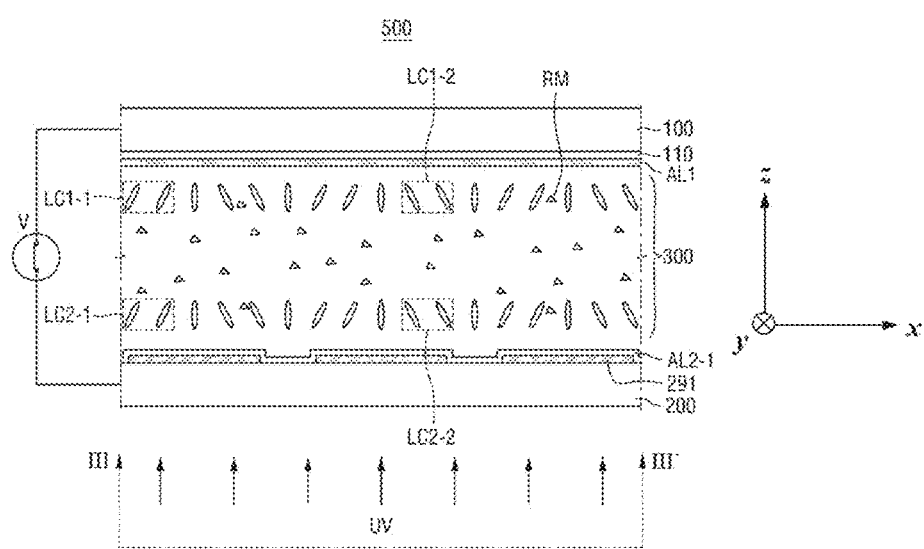

Referring to FIG. 6, as a result of the thermal treatment process H, the reactive mesogens RM contained in the "2-1" flat liquid crystal alignment layer AL2-1 may be eluted into the liquid crystal layer 300. As a result, the "2-1" flat liquid crystal alignment layer AL2-1 of FIG. 6 have a lower content of the reactive mesogens RM than the "2-1" flat liquid crystal alignment layer AL2-1 of FIG. 5, and the liquid crystal layer 300 of FIG. 6, unlike the liquid crystal layer 300 of FIG. 5, may contain the reactive mesogens RM.

In response to an electric field being generated between the common electrode 110 and the pixel electrodes 291 and being applied to the flat LCD 500, the liquid crystal molecules may be obliquely aligned in a direction perpendicular to the electric field. More specifically, "1-1" liquid crystal molecules LC1-1 and "2-1" liquid crystal molecules LC2-1 may be aligned in a first oblique direction, and "1-2" liquid crystal molecules LC1-2 and "2-2" liquid crystal molecules LC2-2 may be aligned in a second oblique direction. Thereafter, in response to UV light being applied onto the flat LCD 500, the polymerization initiator included in the "2-1" flat liquid crystal alignment layer AL2-1 may initiate the photo-polymerization of the reactive mesogens RM, thereby forming a "2-2" flat liquid crystal alignment layer AL2-2.

Figure 7:
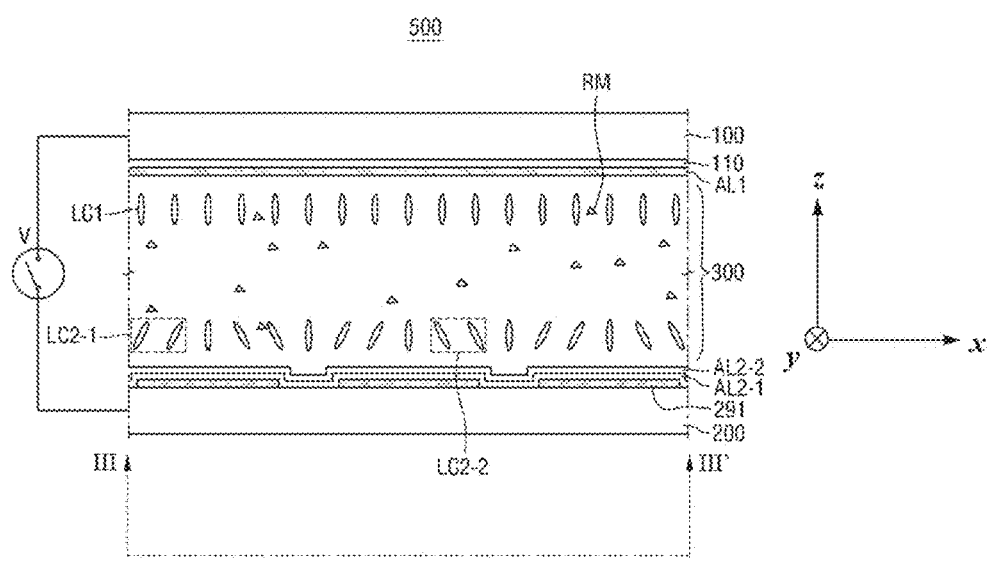

More specifically, referring to FIG. 7, the reactive mesogens RM may move to the "2-1" flat liquid crystal alignment layer AL2-1 including the polymerization initiator and may thus form the "2-2" flat liquid crystal alignment layer AL2-2 on the "2-1" flat liquid crystal alignment layer AL2-1. As the "2-2" flat liquid crystal alignment layer AL2-2 is formed, the content of the reactive mesogens RM in the liquid crystal layer 300 may gradually decrease. It may be understood that the reactive mesogens RM lost from the liquid crystal layer 300 are used to form the "2-2" flat liquid crystal alignment layer AL2-2.

The "2-2" flat liquid crystal alignment layer AL2-2 may comprise polymers of reactive mesogens partially disposed on the surface of the "2-1" flat liquid crystal alignment layer AL2-1. The polymers of reactive mesogens may be spaced apart from each other at a predetermined distance on the surface of the "2-1" flat liquid crystal alignment layer AL2-1.

As more polymers of reactive mesogens are formed, the liquid crystal molecules can be aligned at an inclination. The "2-2" flat liquid crystal alignment layer AL2-2 may fix or stabilize the alignment direction of the "2-1" liquid crystal molecules LC2-1 and the "2-2" liquid crystal molecules LC2-2. Accordingly, the 2-1" liquid crystal molecules LC2-1 and the "2-2" liquid crystal molecules LC2-2 may continue to be obliquely aligned even after the electric field applied to the flat LCD 500 is released. On the other hand, the first liquid crystal molecules LC1 may return to their original state of alignment to be vertically aligned upon the release of the electric field applied to the flat LCD 500. The first liquid crystal molecules may be relatively vertically aligned as compared with the second liquid crystal molecules and the second liquid crystal molecules are relatively tilt-aligned as compared with the first liquid crystal molecules.

Figure 8:
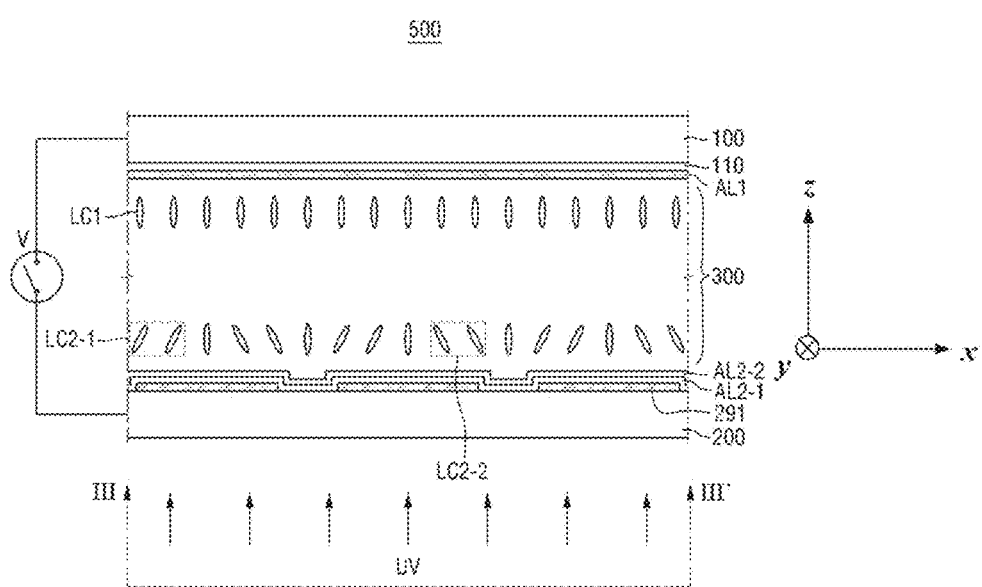
Figure 9:
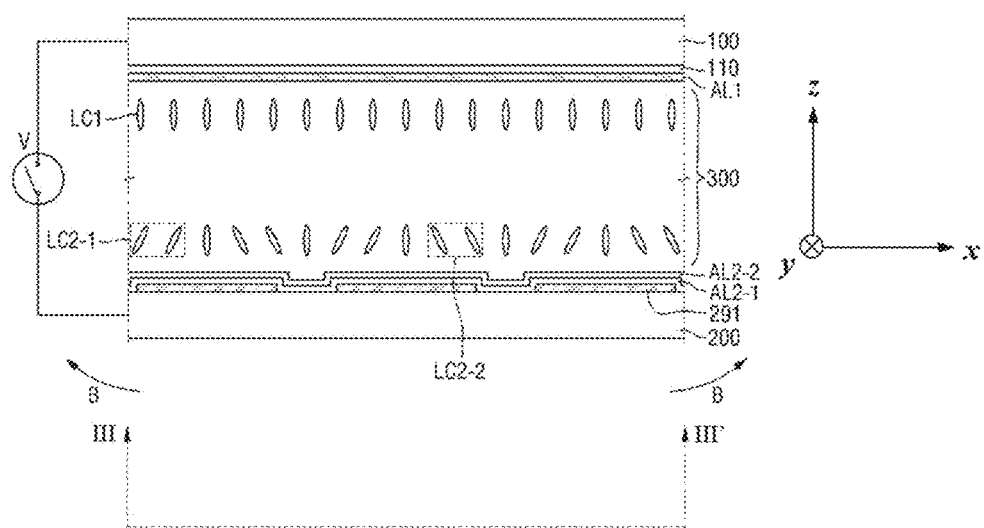

Referring to FIGS. 8 and 9, the residual reactive mesogens RM in the liquid crystal layer 300 may be removed by applying fluorescent UV light onto the flat LCD 500 with no electric field applied to the flat LCD 500. Thereafter, a bending process B for bending the flat LCD 500 may be performed, thereby obtaining a curved LCD (for example, the curved LCD 500C of FIG. 3).

Figure 10:
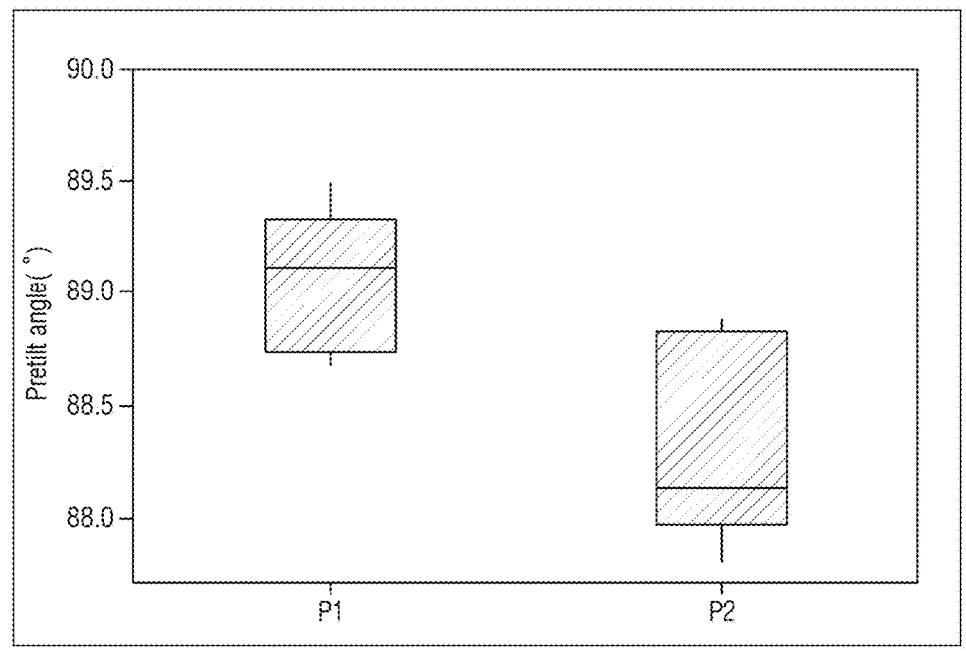
FIG. 10 is an analytical graphical representation of a pre-tilt angle with respect to a flat liquid crystal display device of FIG. 9.

FIG. 10 is an analytical graphical representation of a pre-tilt angle with respect to a flat liquid crystal display device 500 of FIG. 9.

Table 1 shows the measurement results of a pre-tilt angle P1 of liquid crystal molecules LC1 (see FIG. 9) aligned on the surface of a first flat liquid crystal alignment layer AL1 (see FIG. 9) and a pre-tilt angle P2 of second liquid crystal molecules LC2-1 and LC2-2 (see FIG. 9) aligned on the surface of a second flat liquid crystal alignment layer AL2-1 and AL2-2 (see FIG. 9). The pre-tilt angle is an angle between of the first and second flat substrates 100 and 200 and directors the liquid crystal molecules LC1, LC2-1 and LC2-2. For example, if the pre-tilt angle is 90°, the liquid crystal molecules LC1, LC2-1 and LC2-2 may be aligned substantially vertically with respect to the first and second flat substrates 100 and 200 (see FIG. 5), and if the pre-tilt angle is 0°, the liquid crystal molecules LC1, LC2-1 and LC2-2 may be aligned horizontally with respect to the first and second flat substrates 100 and 200.

AL2-2 (see FIG. 9) may prevent texture from being generated due to misalignment between the first curved substrate 100C (see FIG. 3) and the second curved substrate 200C (see FIG. 3) that may occur during the bending process B (see FIG. 9).

Meanwhile, referring to FIG. 3, the pre-tilt angle of the liquid crystal molecules LC1, LC2-1 and LC2-2 at the apex of the curved substrates 100C and 200C is substantially the same as the pre-tilt angle of the liquid crystal molecules LC1, LC2-1 and LC2-2 in the flat substrates 100 and 200. Thus, the pre-tilt angle of the first liquid crystal molecules LC1 aligned on the surface of the first curved liquid crystal alignment layer AL1C may be larger than the pre-tilt angle of the second liquid crystal molecules LC2-1 and LC2-2 aligned on the surface of the second curved liquid crystal alignment layer AL2C. The imaginary straight line C-C' is an imaginary straight line that passes through the apex of the first curved substrate 100C and the apex of the second curved substrate 200C.

For example, a radius R of curvature of the curved LCD 500C may be equal to or greater than 2000 mm and equal to or less than 5000 mm. In this case, the pre-tilt angle of the liquid crystal molecules LC1 aligned on the surface of the first curved liquid crystal alignment layer AL1C at the apex of the curved substrates 100C and 200C may be larger than the pre-tilt angle of the liquid crystal molecules LC2-1 and LC2-2 aligned on the surface of the second curved liquid crystal alignment layer AL2C.

Figure 11:
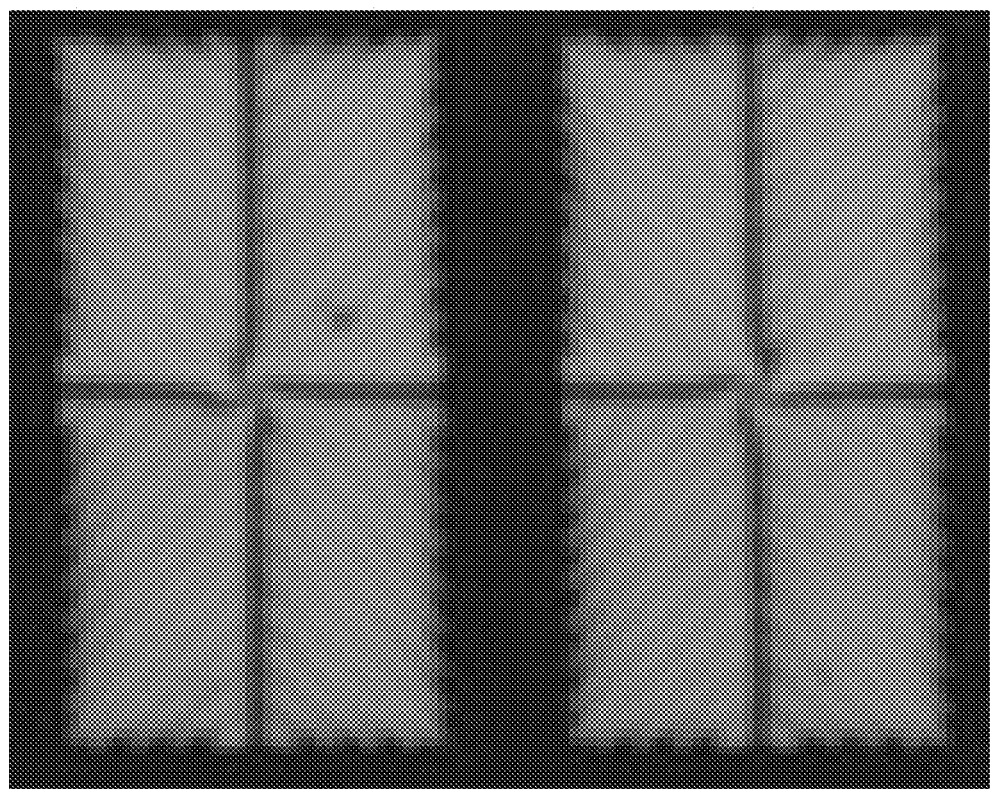
FIG. 11 is an image showing the light transmittance distribution of the curved LCD according to the exemplary embodiment of FIG. 1.
Figure 12:
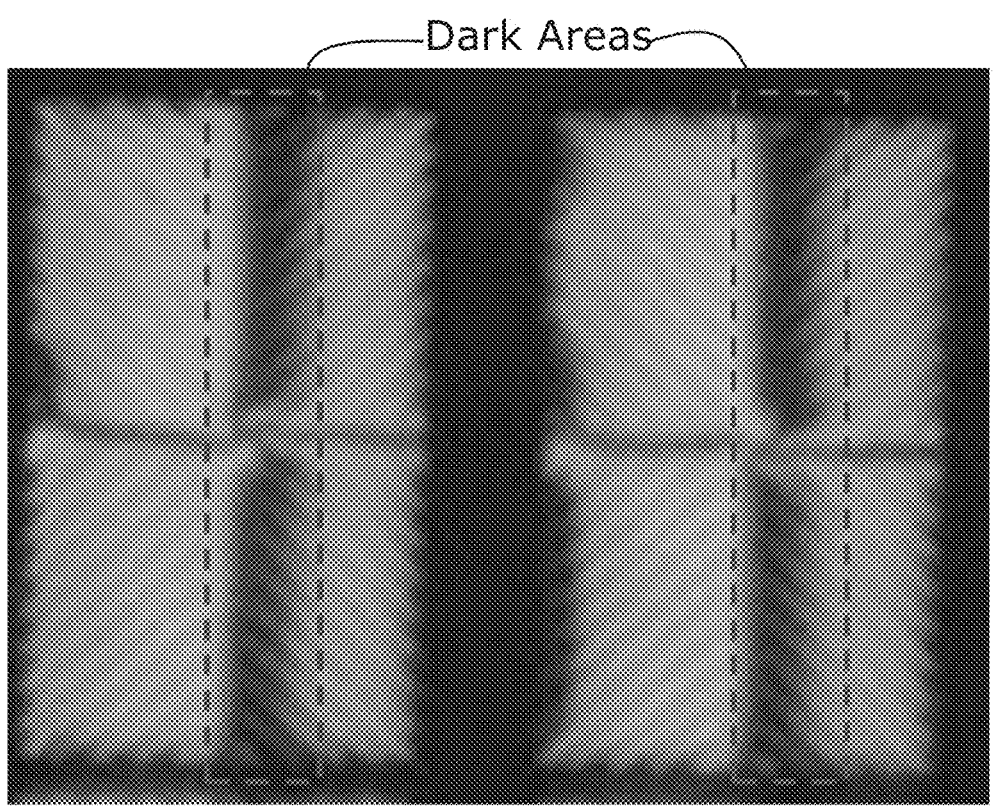
FIG. 12 is an image showing the light transmittance distribution of a curved LCD according to a first comparative example.

FIG. 11 is an image showing the light transmittance distribution of the curved LCD 500C. FIG. 12 is an image showing the light transmittance distribution of a curved LCD according to a first comparative example.

The curved LCD 500C of FIG. 11 was fabricated by forming the first flat liquid crystal alignment layer AL1 on the common electrode 110 using the first VA polyimide and forming the "2-1" flat liquid crystal alignment layer AL2-1 on the pixel electrodes 291 using a composite liquid crystal aligning agent comprising the second VA polyimide and the reactive mesogens RM, as illustrated in FIG. 4; and forming

TABLE 1

| | Number of samples (S/S) = 6 | |
|---|---|---|
| | Pre-tilt angle P1 of the liquid crystal molecules aligned on the surface of the first flat liquid crystal alignment layer | Pre-tilt angle P2 of the liquid crystal molecules aligned on the surface of the second flat liquid crystal alignment layer |
| Maximum value (Max) | 89.52° | 88.88° |
| Minimum value (Min) | 88.69° | 87.82° |
| Average value (Avg) | 89.10° | 88.31° |
| Standard deviation (Std) | 0.313 | 0.439 |

Referring to FIG. 10 and Table 1, the pre-tilt angle P1 of the liquid crystal molecules LC1 (see FIG. 9) aligned on the surface of the first flat liquid crystal alignment layer AL1 (see FIG. 9) has a relatively greater value than the pre-tilt angle P2 of the second liquid crystal molecules LC2-1 and LC2-2 (see FIG. 9) aligned on the surface of the second flat liquid crystal alignment layer AL2-1 and AL2-2 (see FIG. 9).

A difference between the pre-tilt angle P1 of the liquid crystal molecules LC1 (see FIG. 9) aligned on the surface of the first flat liquid crystal alignment layer AL1 (see FIG. 9) and the pre-tilt angle P2 of the second liquid crystal molecules LC2-1 and LC2-2 (see FIG. 9) aligned on the surface of the second flat liquid crystal alignment layer AL2-1 and the liquid crystal layer 300 through the injection of a liquid crystal composition comprising the liquid crystal molecules LC, performing the thermal treatment process H, applying UV light and performing the bending process B, as illustrated in FIGS. 5 to 9.

The curved LCD according to the first comparative example was fabricated by forming both the first flat liquid crystal alignment layer AL1 and the "2-1" flat liquid crystal alignment layer AL2-1 using the composite liquid crystal aligning agent during the step of FIG. 4; forming the liquid crystal layer 300 through the injection of a liquid crystal composition comprising the liquid crystal molecules LC and performing the thermal treatment process H during the step of FIG. 5; applying UV light; and performing the bending process B.

Referring to FIGS. 11 and 12, texture that may be generated due to a conflict between the alignment direction of first liquid crystal molecules and the alignment direction of second liquid crystal molecules is viewed from the curved LCD according to the first comparative example as dark areas, as indicated by dotted lines, but no such texture is detected in the curved LCD 500C.

Figure 13:
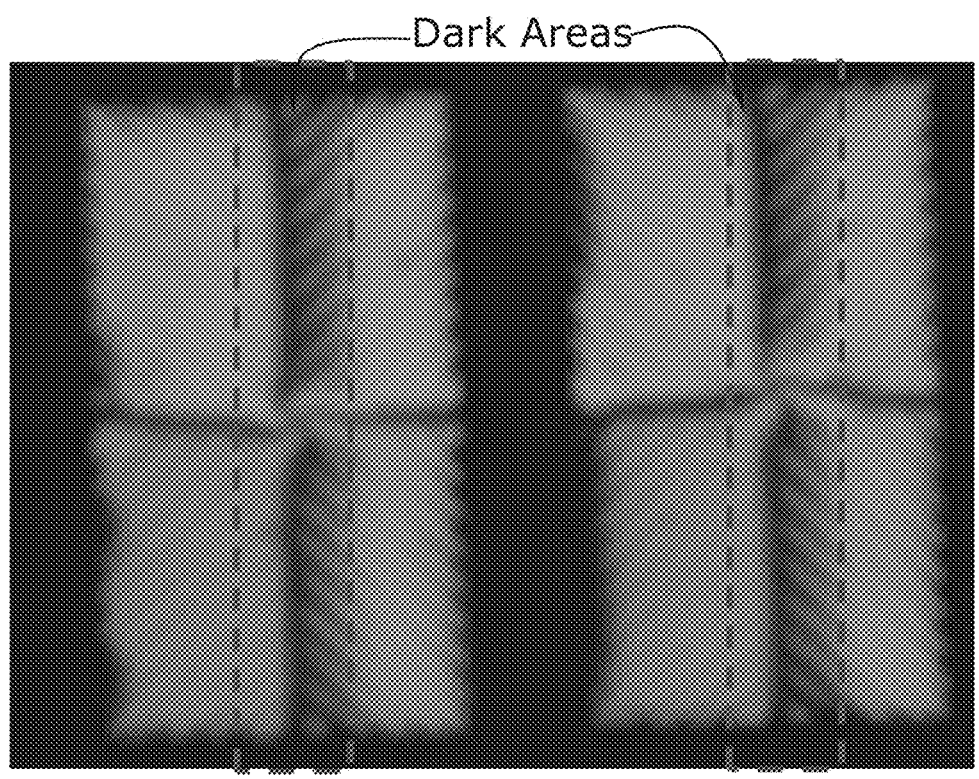
FIG. 13 is an image showing the light transmittance distribution of a curved LCD according to a second comparative example.

FIG. 13 is an image showing the light transmittance distribution of a curved LCD according to a second comparative example. The curved LCD according to the second comparative example was fabricated by forming both the first flat liquid crystal alignment layer AL1 and the "2-1" flat liquid crystal alignment layer AL2-1 using the first VA polyimide during the step of FIG. 4; forming the liquid crystal layer 300 through the injection of a liquid crystal composition comprising both the reactive mesogens RM and the liquid crystal molecules LC during the step of FIG. 5; applying UV light; and performing the bending process B.

Referring to FIG. 13, texture that may be generated due to a conflict between the alignment direction of first liquid crystal molecules and the alignment direction of second liquid crystal molecules is viewed from the curved LCD according to the second comparative example as dark areas.

While the invention has been particularly shown and described with reference to exemplary embodiments thereof, it will be understood by those of ordinary skill in the art that various changes in provide and detail may be made therein without departing from the spirit and scope of the invention as defined by the following claims. The exemplary embodiments should be considered in a descriptive sense only and not for purposes of limitation.

What is claimed is:

1. A curved liquid crystal display (LCD) device, comprising:
   a first curved substrate;
   a second curved substrate;
   a first curved liquid crystal alignment layer disposed between the first curved substrate and the second curved substrate;
   a second curved liquid crystal alignment layer disposed between the first curved liquid crystal alignment layer and the second curved substrate, wherein the second curved liquid crystal alignment layer comprises polymerized reactive mesogens, wherein the second curved liquid crystal alignment layer comprises a polymerization initiator; and
   a liquid crystal layer comprising first and second liquid crystal molecules disposed between the first curved liquid crystal alignment layer and the second curved liquid crystal alignment layer,
   wherein the first liquid crystal molecules are aligned at a surface of the first curved liquid crystal alignment layer,
   wherein the second liquid crystal molecules are aligned at a surface of the second curved liquid crystal alignment layer,
   wherein, in an initial state when no electric field is applied, the first liquid crystal molecules are vertically aligned relative to the second liquid crystal molecules with respect to the first curved substrate and the second liquid crystal molecules are tilt-aligned relative to the first liquid crystal molecules with respect to the first curved substrate,
   wherein the first curved liquid crystal alignment layer comprises polymerized reactive mesogens, the second curved liquid crystal alignment layer has a higher content of polymerized reactive mesogens per unit area than the first curved liquid crystal alignment layer, and wherein the first curved liquid crystal alignment layer does not comprise a polymerization initiator,
   wherein the first curved substrate comprises a first side facing the second curved substrate and a second side opposite to the first side, and wherein the second side of the first curved substrate is concave.

2. The curved LCD device of claim 1, wherein the liquid crystal molecules have negative dielectric anisotropy.

3. The curved LCD device of claim 1, further comprising:
   a patternless electrode disposed between the first curved substrate and the first curved liquid crystal alignment layer, the patternless electrode comprising no slit pattern; and
   a pattern electrode disposed between the second curved liquid crystal alignment layer and the second curved substrate, the pattern electrode comprising a slit pattern.

4. The curved LCD device of claim 3, the pattern electrode being a pixel electrode, wherein each pixel electrode in each pixel comprises:
   a cross-shaped stem defining four quadrants; and
   branch electrodes diagonally extending in each quadrant from the cross-shaped stem, the branch electrodes being spaced-apart from each other by incisions, wherein liquid crystal molecules arranged adjacent to and corresponding to each of the four quadrants are orientated differently according to a direction of the branch electrodes within each quadrant.

5. The curved LCD device of claim 1,
   wherein the first curved liquid crystal alignment layer does not comprise polymerized reactive mesogens.

6. The curved LCD device of claim 1, wherein the second curved liquid crystal alignment layer comprises:
   a type one curved liquid crystal alignment layer; and
   a type two curved liquid crystal alignment layer comprising a lower content of an imide group (—CONHCO—) than the type one curved liquid crystal alignment layer.

7. The curved LCD device of claim 6, wherein the first curved liquid crystal alignment layer consists of a single layer.

8. The curved LCD device of claim 1, wherein the second curved liquid crystal alignment layer comprises:
   a type one curved liquid crystal alignment layer; and
   a type two curved liquid crystal alignment layer comprising a higher content of polymerized reactive mesogens than the type one curved liquid crystal alignment layer.

9. The curved LCD device of claim 1, wherein the first curved substrate comprises a first side facing the second curved substrate and a second side opposite the first side, and
   wherein the first side of the first curved substrate is convex.

10. The curved LCD device of claim 1, wherein the reactive mesogens are represented by a formula P1-SP1-MG-SP2-P2 wherein each of P1 and P2 is a polymerizable end group selected from the group consisting of a (meth)acrylate group, a vinyl group, a vinyloxy group, and an epoxy group, SP1 being a spacer group linking P1 to MG and selected from the group consisting of an alkyl group having a carbon number of 1 to 12 and an alkoxy group having a carbon number of 1 to 12, SP2 being a spacer group linking P2 to MG and selected from the group consisting of an alkyl group having a carbon number of 1 to 12 and an alkoxy group having a carbon number of 1 to 12, and MG being a mesogenic structure selected from the group consisting of a cyclohexyl group, a biphenyl group, a terphenyl group, and a naphthalene.

11. The curved LCD device of claim 1, wherein a pre-tilt angle of the first liquid crystal molecules has an average of 89.10° with a standard deviation of 0.313°, and a pre-tilt angle of the second liquid crystal molecules has an average of 88.31° and a standard deviation of 0.439°.

12. A curved liquid crystal display (LCD) device, comprising:
   a first curved substrate;
   a second curved substrate;
   a liquid crystal layer disposed between the first curved substrate and the second curved substrate, wherein the liquid crystal layer comprises liquid crystal molecules;
   a first curved liquid crystal alignment layer disposed between the liquid crystal layer and the first curved substrate; and
   a second curved liquid crystal alignment layer disposed between the liquid crystal layer and the second curved substrate,
   wherein the second curved liquid crystal alignment layer comprises a polymerization initiator, wherein the second curved liquid crystal alignment layer comprises polymerized reactive mesogens,
   wherein the first curved liquid crystal alignment layer comprises polymerized reactive mesogens, the second curved liquid crystal alignment layer has a higher content of polymerized reactive mesogens per unit area than the first curved liquid crystal alignment layer, and
   wherein the first curved liquid crystal alignment layer does not comprise a polymerization initiator,
   wherein the first curved substrate comprises a first side facing the second curved substrate and a second side opposite to the first side, and wherein the second side of the first curved substrate is concave.

13. The curved LCD device of claim 12, wherein the liquid crystal molecules comprises:
   first liquid crystal molecules aligned at a surface of the first curved liquid crystal alignment layer; and
   second liquid crystal molecules aligned at a surface of the second curved liquid crystal alignment layer,
   wherein, in an initial state when no electric field is applied, the first liquid crystal molecules are relatively vertically aligned as compared to the second liquid crystal molecules with respect to the first curved substrate and the second liquid crystal molecules are relatively tilt-aligned as compared to the first liquid crystal molecules with respect to the first curved substrate.

14. The curved LCD device of claim 12, further comprising:
   a patternless electrode disposed between the first curved substrate and the first curved liquid crystal alignment layer, the patternless electrode comprising no slit pattern; and
   a pattern electrode disposed between the second curved liquid crystal alignment layer and the second curved substrate, the pattern electrode comprising a slit pattern.

15. The curved LCD device of claim 12, wherein the second curved liquid crystal alignment layer comprises:
   a type one curved liquid crystal alignment layer; and
   a type two curved liquid crystal alignment layer comprising a lower content of an imide group (—CONHCO—) than the type one curved liquid crystal alignment layer, wherein the first curved liquid crystal alignment layer consists of a single layer.

16. The curved LCD device of claim 12, wherein the second curved liquid crystal alignment layer comprises:
   a type one curved liquid crystal alignment layer; and
   a type two curved liquid crystal alignment layer comprising a higher content of polymerized reactive mesogens than the type one curved liquid crystal alignment layer.

17. The curved LCD device of claim 12, wherein the first side of the first curved substrate is convex.

* * * * *